(12) United States Patent
Nomura et al.

(10) Patent No.: US 12,507,069 B2
(45) Date of Patent: Dec. 23, 2025

(54) COMMUNICATION MONITORING DEVICE AND COMMUNICATION MONITORING METHOD

(71) Applicant: HONDA MOTOR CO., LTD., Tokyo (JP)

(72) Inventors: Takumi Nomura, Tokyo (JP); Tomoya Kitano, Tokyo (JP); Tatsuroh Saitoh, Tokyo (JP); Shuji Tomimatsu, Tokyo (JP); Sora Nishigaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 514 days.

(21) Appl. No.: 18/075,982

(22) Filed: Dec. 6, 2022

(65) Prior Publication Data

US 2023/0199490 A1 Jun. 22, 2023

(30) Foreign Application Priority Data

Dec. 20, 2021 (JP) .................................. 2021-206101
Aug. 24, 2022 (JP) .................................. 2022-133179

(51) Int. Cl.
*H04W 12/069* (2021.01)
*H04W 4/48* (2018.01)
*H04W 12/0471* (2021.01)
*H04W 12/08* (2021.01)
*H04W 12/102* (2021.01)
*H04W 24/04* (2009.01)

(52) U.S. Cl.
CPC ........... *H04W 12/069* (2021.01); *H04W 4/48* (2018.02); *H04W 12/0471* (2021.01); *H04W 12/08* (2013.01); *H04W 12/102* (2021.01); *H04W 24/04* (2013.01)

(58) Field of Classification Search
CPC ................................................ H04W 4/30–80
See application file for complete search history.

(56) References Cited

U.S. PATENT DOCUMENTS

| | | | |
|---|---|---|---|
| 2014/0040992 A1* | 2/2014 | Koide | H04L 63/0442 726/4 |
| 2018/0229739 A1* | 8/2018 | Imamoto | H04W 4/48 |
| 2018/0294991 A1* | 10/2018 | Tsurumi | B60R 25/00 |

(Continued)

FOREIGN PATENT DOCUMENTS

| | | |
|---|---|---|
| CN | 109844667 A | 6/2019 |
| CN | 113348683 A | 9/2021 |

(Continued)

OTHER PUBLICATIONS

Japanese Office Action dated Mar. 12, 2024 issued in corresponding Japanese application No. 2022-133179; English machine translation included (6 pages).

(Continued)

*Primary Examiner* — San Htun
(74) *Attorney, Agent, or Firm* — Rankin, Hill & Clark LLP (57) ABSTRACT

In order to monitor communication by a frame column performed among electronic controllers, a communication monitoring device determines some or all of fields configuring a frame as an object section, extracts the object section as an attention section from the frame received from an in-vehicle network, and verifies validity of the received frame based on the attention section.

14 Claims, 5 Drawing Sheets

(56) References Cited

U.S. PATENT DOCUMENTS

| | | | |
|---|---|---|---|
| 2018/0302422 A1* | 10/2018 | Kishikawa | H04L 9/3271 |
| 2019/0116157 A1 | 4/2019 | Kishikawa et al. | |
| 2019/0195741 A1 | 6/2019 | Sakai et al. | |
| 2019/0312895 A1* | 10/2019 | Fujimura | H04L 12/28 |
| 2020/0107194 A1* | 4/2020 | Ueki | H04Q 9/00 |
| 2021/0044610 A1 | 2/2021 | Kishikawa et al. | |
| 2021/0226919 A1 | 7/2021 | Kishikawa et al. | |
| 2021/0349977 A1 | 11/2021 | Kishikawa et al. | |

FOREIGN PATENT DOCUMENTS

| | | |
|---|---|---|
| JP | 2018-111468 A | 7/2018 |
| JP | 2018-160786 A | 10/2018 |
| JP | 2020-61789 A | 4/2020 |
| WO | 2017/119027 A1 | 7/2017 |
| WO | 2018/008452 A1 | 1/2018 |
| WO | 2018/105330 A1 | 6/2018 |
| WO | 2020/022444 A1 | 1/2020 |

OTHER PUBLICATIONS

Chinese Office Action Corresponding to CN 202211605778, dated May 31, 2025, 13 pages.

\* cited by examiner

COMMUNICATION MONITORING DEVICE AND COMMUNICATION MONITORING METHOD

INCORPORATION BY REFERENCE

The present application claims priority under 35 U.S.C. § 119 to Japanese Patent Application No. 2021-206101 filed on Dec. 20, 2021 and Japanese Patent Application No. 2022-133179 filed on Aug. 24, 2022. The content of the applications is incorporated herein by reference in its entirety.

BACKGROUND OF THE INVENTION

Field of the Invention

The present invention relates to a communication monitoring device and a communication monitoring method that monitor communication via an in-vehicle network.

Description of the Related Art

International Publication No. WO 2018/008452 describes an improper control suppressing method in a network system provided with a plurality of electronic control units which exchange a plurality of frames via a communication channel. In the improper control suppressing method, a control frame which instructs predetermined control to a controlled object and a state frame including information regarding a state of the controlled object are successively received from the communication channel. Then, on the basis of a set of the state frames received within a predetermined period preceding the time of reception of the received control frame, whether or not to suppress the predetermined control based on the received control frame is determined.

However, in the conventional improper control suppressing method described above, since control information and state information of the frames communicated for the controlled object are examined, processing loads for improper control detection become heavier together with the number of the controlled objects to be the objects of processing impropriety detection. For example, when improper control in entry processing when a person is boarding a vehicle is to be prevented, the improper control needs to be detected with various ECUs including a key communication ECU which controls communication with a smart key, a key authentication ECU (immobilizer) and a door lock control ECU or the like as the controlled objects.

On the other hand, as vehicle functions are diversified, acceleration of routing processing in an in-vehicle network is also demanded, and the processing needs to be simplified while maintaining high security performance such as detection of a forged frame.

In addition, as in a conventional technology described above, in a case of fixedly using a specific ECU as the controlled object of the improper control detection, once the controlled object is specified by a third person, the improper control detection could be invalidated by a malicious person.

From the above-described background, an object of the present invention is, regarding detection of improper communication in communication via an in-vehicle network performed among a plurality of electronic controllers, to reduce the processing loads without lowering a detection probability of the improper communication.

The detection of the improper communication in the in-vehicle network effectively prevents occurrence of theft by controlling a communication attack made at the time of vehicle theft for example and can contribute to achievement of SDGs through realization of secure, safe and sustainable motorized society (SDGs 11.2 or the like).

SUMMARY OF THE INVENTION

According to one mode of the present invention aspect, a communication monitoring device monitors communication via an in-vehicle network performed among a plurality of electronic controllers, the communication is configured by a column of one or more frames, and the communication monitoring device includes: an object determination unit configured to determine some or all of fields configuring the frame as an object section; a reception unit configured to receive the frame propagated through the in-vehicle network; an extraction unit configured to extract the object section as an attention section from a reception frame which is the frame received by the reception unit; and a verification unit configured to verify validity of the reception frame based on the extracted attention section.

According to another mode of the present invention aspect, the object determination unit divides the frame used for the communication into a plurality of field groups according to one division rule, and determines at least one of the field groups as the object section.

According to a further mode of the present invention aspect, the extraction unit counts a usage count for which each of the field groups is used for extraction of the attention section, and the object determination unit determines, when a difference between a maximum value and a minimum value of the usage counts among the field groups is a first predetermined value or larger, at least one new object section from the plurality of divided field groups excluding the field group the usage count of which is the maximum value.

According to a still further mode of the present invention aspect, the object determination unit determines a new object section from all the divided field groups, when the difference between the maximum value and the minimum value of the usage counts among the field groups is smaller than a second predetermined value.

According to a yet further mode of the present invention aspect, the extraction unit counts a usage count for which each of the field groups is used for extraction of the attention section, and the object determination unit changes the division rule, newly divides the frame into a plurality of field groups according to the changed division rule, and determines at least one of the plurality of newly divided field groups as the object section, when the difference between the maximum value and the minimum value of the usage counts among the field groups is smaller than a third predetermined value.

According to a yet still further mode of the present invention aspect, the extraction unit initializes, when the object determination unit newly divides the frame into a plurality of field groups according to the changed division rule, the usage counts of all the newly divided field groups to 0.

According to a yet still further mode of the present invention aspect, the object determination unit increases the number of the field groups to be determined as the object section from the plurality of divided field groups, when the verification unit determines that at least one of the attention sections extracted by the extraction unit from each of the reception frames is not proper.

According to a yet still further mode of the present invention aspect, the object determination unit determines all of the plurality of divided field groups as the object section, when the verification unit determines that at least one of the attention sections extracted by the extraction unit from each of the reception frames is not proper.

According to a yet still further mode of the present invention aspect, the verification unit sets a monitoring period of a predetermined time length, and the reception unit receives the frame propagated through the in-vehicle network in the monitoring period.

According to a yet still further mode of the present invention aspect, the object determination unit randomly determines at least one of the field groups as the object section every time the monitoring period starts.

According to a yet still further mode of the present invention aspect, the verification unit verifies the validity for a predetermined number of the reception frames in each monitoring period, and increases the time length of the monitoring period when one of the reception frames is determined as not being proper.

According to a yet still further mode of the present invention aspect, the verification unit increases the predetermined number when one of the extracted reception frames is determined as not being proper.

According to a yet still further mode of the present invention aspect, the verification unit repeatedly sets the monitoring periods with a suspension period in-between, and irregularly changes the time length of the suspension period within a predetermined range.

The object determination unit determines a different field or a set of fields as the object section for each of a plurality of sets of the reception frames for each monitoring period.

A yet still further mode of the present invention aspect is a communication monitoring method conducted by a computer of a communication monitoring device which monitors communication via an in-vehicle network performed among a plurality of electronic controllers, the communication is configured by a column of one or more frames, and the communication monitoring method includes: a step of determining some or all of fields configuring the frame as an object section; a step of repeatedly receiving the frame propagated through the in-vehicle network; a step of extracting the object section as an attention section from a reception frame which is the frame received in the receiving step; and a step of verifying validity of the reception frame based on the extracted attention section.

According to the present invention aspect, regarding detection of improper communication in communication via an in-vehicle network performed among a plurality of electronic controllers, the processing loads can be reduced without lowering a detection probability of the improper communication.

DETAILED DESCRIPTION OF THE PREFERRED EMBODIMENTS

Hereinafter, a control system of a vehicle including a communication monitoring device according to one embodiment of the present invention will be described with reference to the drawings.

Figure 1:
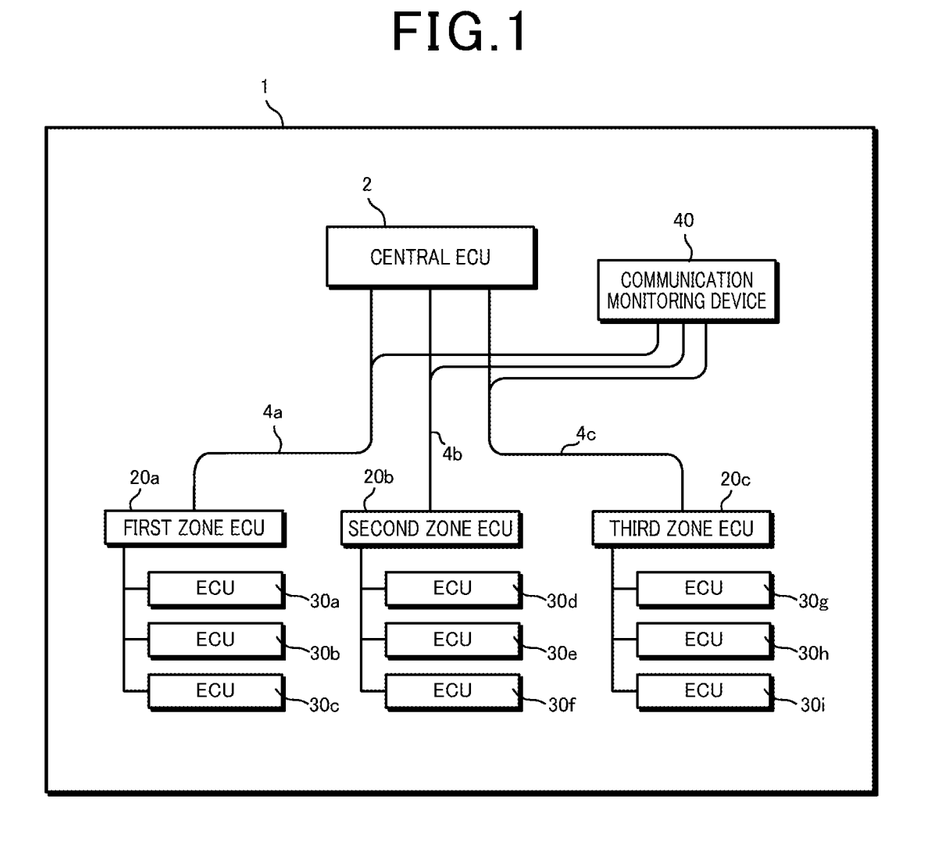
FIG. 1 is a block diagram of a vehicle including a communication monitoring device according to one embodiment of the present invention.

FIG. 1 is a diagram illustrating a control system 1 of a vehicle.

The control system 1 includes a central ECU 2 which performs overall control of the vehicle and information processing. Hereinafter, the vehicle loaded with the control system 1 is referred to as a present vehicle. The central ECU 2 is connected to communication lines 4a, 4b and 4c, and achieves a function of a gateway which manages exchange of communication data among the communication lines. In addition, the central ECU 2 is connected with a wireless device (not illustrated) based on a communication standard of a mobile communication system, and executes OTA (Over The Air) management. The OTA management includes control of downloading an update program of an in-vehicle device provided in the present vehicle from a server outside the vehicle and applying the update program to the in-vehicle device.

To the communication lines 4a, 4b and 4c, a first zone ECU 20a, a second zone ECU 20b, and a third zone ECU 20c are connected respectively. ECUs 30a, 30b and 30c are connected to the first zone ECU 20a, and ECUs 30d, 30e and 30f are connected to the second zone ECU 20b. In addition, ECUs 30g, 30h and 30i are connected to the third zone ECU 20c.

Hereinafter, the first zone ECU 20a, the second zone ECU 20b and the third zone ECU 20c are also referred to as zone ECUs 20 collectively, and the ECUs 30a, 30b, 30c, 30d, 30e, 30f, 30g, 30h and 30i are also referred to as ECUs 30 collectively.

The ECUs 30 may include an ECU which controls operations of various devices and sensors provided in the present vehicle, such as an MPU (Map Positioning Unit), an MVC-ECU (MVC; Multi View Camera), a PKS-ECU (PKS; Parking Support), and/or an ADAS-ECU (ADAS; Advanced Driver-Assistance System) or the like. Such devices and sensors may include a motor for traveling which makes the present vehicle travel, a steering operation device such as an accelerator or a brake, a VSA device (VSA; Vehicle Stability Assist), a battery, a lamp body such as a head lamp, a window motor which drives a door window, an actuator which drives a door lock mechanism, a door lock sensor, a door opening/closing sensor, a temperature sensor, a vehicle outside camera, and a vehicle compartment camera or the like.

To each zone ECU 20, the plurality of ECUs 30 disposed in a same section of a vehicle body space of the present vehicle or the plurality of ECUs 30 which control the operations of the device and the sensor disposed in the same section are connected.

To the central ECU 2, other controllers and apparatuses may be connected in addition to the zone ECUs 20. Such controllers and apparatuses may include an ICB (Infotainment Control Box), a speaker, a microphone, a meter panel, a steering switch, a GNSS sensor and a touch panel or the like.

The communication lines 4a, 4b and 4c are configured by CAN buses which perform communication based on a CAN communication standard for example, in the present embodiment. Hereinafter, the communication lines 4a, 4b and 4c are collectively referred to as communication lines 4. Here, the communication lines 4 correspond to an in-vehicle network in the present disclosure. In addition, the zone ECUs 20 connected to the communication lines 4 correspond to a plurality of electronic controllers in the present disclosure.

According to a conventional technology, the zone ECUs 20 connected to the communication lines 4 send out data to be transmitted to the communication lines 4 by one frame or as a column of a plurality of frames according to the CAN communication standard. According to the CAN communication standard, each frame to be sent out includes an identification code (ID), and each zone ECU 20 which receives the frame determines whether or not the frame is the frame transmitted to itself based on the ID included in the frame.

In the present embodiment, in particular, the control system 1 includes a communication monitoring device 40 connected to the communication lines 4a, 4b and 4c. The communication monitoring device 40 monitors the communication via the communication lines 4 performed among the plurality of zone ECUs 20.

Configuration of Communication Monitoring Device

Figure 2:
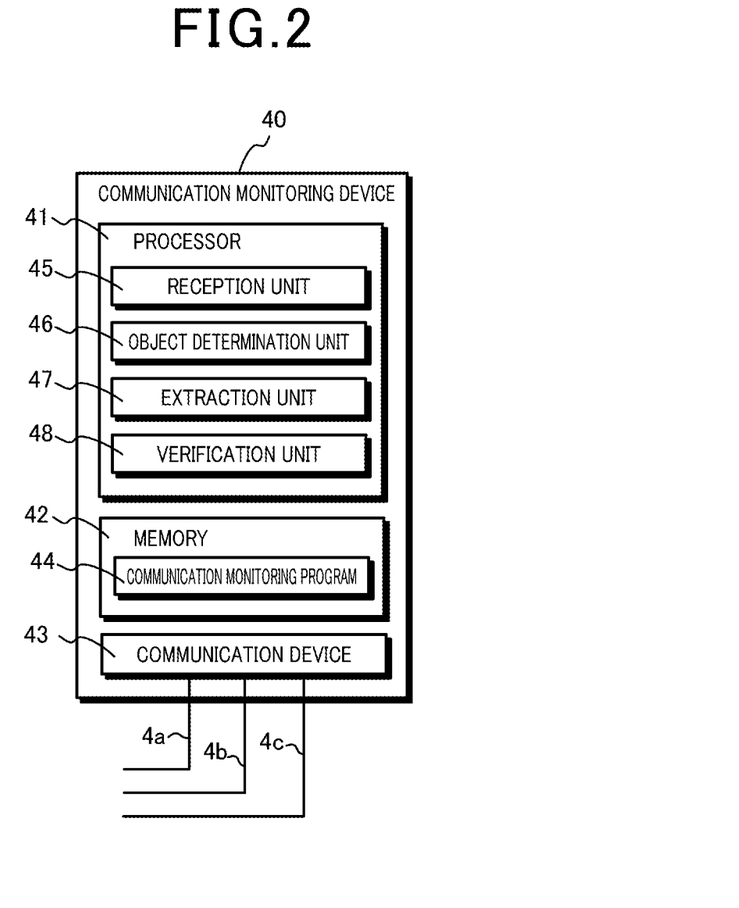
FIG. 2 is a diagram illustrating a configuration of the communication monitoring device.

FIG. 2 is a diagram illustrating a functional configuration of the communication monitoring device 40.

The communication monitoring device 40 includes a processor 41, a memory 42 and a communication device 43. The memory 42 is configured by a volatile and/or nonvolatile semiconductor memory and/or a hard disk device or the like, for example. The communication device 43 includes three CAN transceivers (not illustrated) connected to each of the communication lines 4a, 4b and 4c which are the CAN communication buses, for example.

The processor 41 is a computer provided in the communication monitoring device 40, and is configured by one or more CPUs (Central Processing Units) for example.

The processor 41 includes a reception unit 45, an object determination unit 46, an extraction unit 47 and a verification unit 48 as functional elements or functional units. The functional elements provided in the processor 41 are realized by the processor 41 which is a computer executing a communication monitoring program 44 which is a computer program stored in the memory 42, for example. Alternatively, all or some of the functional elements provided in the processor 41 may be configured by hardware including one or more electronic circuit parts respectively.

The reception unit 45 receives the frames propagated through each of the communication lines 4a, 4b and 4c by the communication device 43 in a monitoring period set by the verification unit 48. Start of the monitoring period may be instructed to the reception unit 45 by the verification unit 48, or may be determined by the reception unit 45 according to a time length and an execution interval of the monitoring period instructed by the verification unit 48.

Hereinafter, the reception unit 45, the object determination unit 46, the extraction unit 47 and the verification unit 48 independently execute processing for the frames propagated through each of the communication lines 4a, 4b and 4c respectively for the communication lines 4a, 4b and 4c.

The object determination unit 46 determines (or defines) some or all of fields configuring the frame used for the communication as an object section. Specifically, the object determination unit 46 divides the frame into a plurality of field groups according to one division rule, and determines at least one of the field groups as the object section. The object determination unit 46 randomly determines at least one object section for each monitoring period for example.

The division rule may determine the number of the field groups to be created and the number of fields configuring each field group, for example. The number of the groups and the number of the fields may be randomly determined using a random number generation function, for example. The object determination unit 46 divides the frame into the plurality of field groups by creating place holders of the field groups according to the number of the groups and the number of the fields determined by the division rule and randomly applying a specific field to each of the created place holders.

The extraction unit 47 extracts a field part of the field group indicated by the object section determined by the object determination unit 46 as an attention section from a reception frame which is the frame received by the reception unit 45.

The verification unit 48 verifies validity of the reception frame including the attention section based on the attention section extracted by the extraction unit 47.

Specifically, the verification unit 48 sets the monitoring period of a predetermined time length. Then, the verification unit 48 extracts a predetermined number of the reception frames from the frame received in the monitoring period for each monitoring period, and verifies the validity of the reception frames based on the predetermined number of the reception frames (that is, based on an attention section extracted from the predetermined number of the reception frames).

Figure 3:
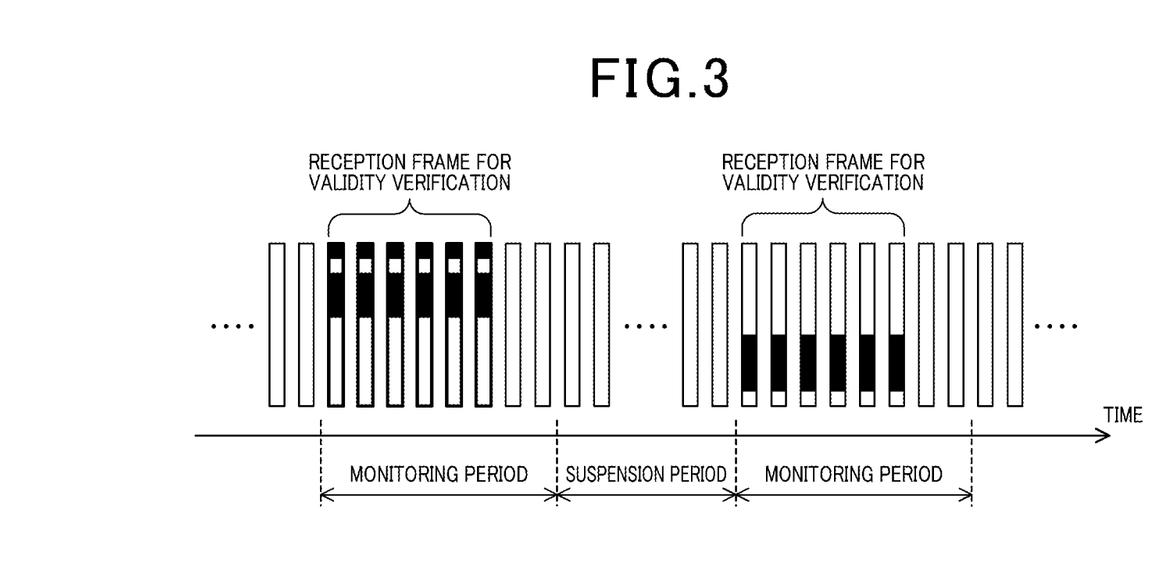
FIG. 3 is a diagram for explaining verification of frame validity in the communication monitoring device.

FIG. 3 is a diagram for explaining validity verification in a transmitted frame column. In FIG. 3, a horizontal axis is time, and each vertically long rectangle is the frame transmitted through the communication line 4a at each time. In an example in FIG. 3, a suspension period during which the reception unit 45 does not receive the frame is held between the monitoring periods. In the monitoring period, eight reception frames are present, and six reception frames among them are extracted as the reception frames used for the validity verification. In FIG. 3, the reception frames used for the validity verification are illustrated by rectangles of a thick line.

In FIG. 3, the first six frames received in the monitoring period are the reception frames used for the validity verification, however, it is an example and the reception frames used for the validity verification may be arbitrarily selected from the frames received in the monitoring period. In FIG. 3, a black-painted part in the thick-line rectangle illustrating the reception frame used for the validity verification is the attention section extracted corresponding to the object section. The object section (therefore, the attention section) does not need to be configured by continuous fields in the frame and may be configured by a plurality of fields present at distant positions in the frame. In the example in FIG. 3, the attention section is configured by the field group including the fields present at the two distant positions in the reception frame in the monitoring period illustrated on a left side in the figure, and is configured by the field group including the fields present at the continuous positions in the monitoring period illustrated on a right side in the figure. In addition, since the object section is determined for each monitoring period, the attention section also occupies different positions in the reception frame for each monitoring period.

The object section determined as the one indicating the position of the attention section used for the validity verification is selected from the plurality of field groups dividing the frame in the object determination unit 46. Thus, a reference of the validity verification for the attention section extracted from the position indicated by the object section in the reception frame can be easily determined according to a content definition of the fields included in the field group for example.

As an example, the validity of the reception frame may be verified based on the reference whether or not content abnormality is recognized and/or whether or not there is consistency in the attention sections extracted by the extraction unit 47 from each of the predetermined number of the reception frames.

Here, the "content abnormality" and the "consistency" described above can be predefined corresponding to types of the fields included in the attention section.

For example, in a case where ID fields are included in the attention section, the "content abnormality" may be that an ID included in the ID fields includes one, two or more predetermined codes other than ID codes. Alternatively, the "content abnormality" may be, for example, in the case where data fields are included in the attention section, that an abnormal value exceeding a predetermined value range is included in data indicated by the data fields. Further, alternatively, the "content abnormality" may be abnormality of a CRC value in a CRC field, for example.

In addition, in the case where the data fields are included in the attention section, the "consistency" may be that there is no abnormal change (for example, change exceeding a predetermined threshold) of a numerical value included in the data field among the predetermined number of the attention sections, for example.

The communication monitoring device 40 having the configuration described above divides the frame into a plurality of field groups, determines the object section from the plurality of field groups randomly for each monitoring period for example, and extracts the attention section corresponding to the object section for each reception frame. Then, in the communication monitoring device 40, the validity of the reception frame is verified based on the extracted attention section.

In the communication monitoring device 40, the validity of the reception frame is verified based on the attention section which is a part of the reception frame so that processing loads for the validity verification are reduced compared to a conventional technology of examining control information and state information of the frames communicated for a specific controlled object.

In addition, in the communication monitoring device 40, the object section which stipulates the attention section can be arbitrarily selected from the frame by a random selection from the plurality of field groups for example so that all the frames can be finally verified by repetition of verification processing. Thus, in the communication monitoring device 40, the attention section used for the verification is prevented from being fixed to a specific part of the frame and a high detection probability of improper communication (improper frame) can be maintained.

Next, some modifications of the communication monitoring device 40 will be described.

First Modification

As the first modification, the extraction unit 47 counts a usage count for which each of the field groups divided by the object determination unit 46 is used for extraction of the attention section, and notifies the object determination unit 46 of a count value.

Then, when a difference between a maximum value and a minimum value of the usage counts among the plurality of field groups is a first predetermined value (for example, 3) or larger, the object determination unit 46 determines at least one new object section from the plurality of divided field groups excluding the field group the usage count of which is the maximum value. The new object section may be randomly determined, for example.

According to the configuration, since the object section is selected from the field groups other than the field group which is used many times, the high detection probability of the improper frame can be further accurately maintained.

Alternatively, the object determination unit 46 may determine a new object section from all the divided field groups, when the difference between the maximum value and the minimum value of the usage counts among the field groups is smaller than a second predetermined value (for example, 3). The new object section may be randomly determined for example.

According to the configuration, since a new object section is selected from all the field groups when the difference of the usage counts among the object section field groups becomes small, the high detection probability of the improper frame can be further accurately maintained.

In addition, alternatively, the object determination unit 46 may change the division rule and newly divide the frame into a plurality of field groups according to the changed division rule, when the difference between the maximum value and the minimum value of the usage counts among the field groups is smaller than a third predetermined value (for example, 3). The object determination unit 46 determines one of the plurality of newly divided field groups as the object section for each monitoring period for example. In this case, when the object determination unit 46 newly divides the frame into a plurality of field groups according to the changed division rule, the extraction unit 47 initializes the usage counts of all the newly divided field groups to 0. Note that the new object section may be randomly determined, for example.

According to the configuration, since the division rule of the field groups is changed, arbitrariness of the object section used for the verification is improved. In addition, since the division rule of the field groups is changed when the difference of the usage counts among the field groups becomes small, decline of the detection probability of the improper frame due to the change of the division rule in a state where the individual parts of the frame are not equally verified is prevented. In addition, since the count values of the usage counts are reset accompanying the change of the division rule, the usage counts for the sections divided according to the new division rule can be appropriately counted.

Second Modification

Figure 4:
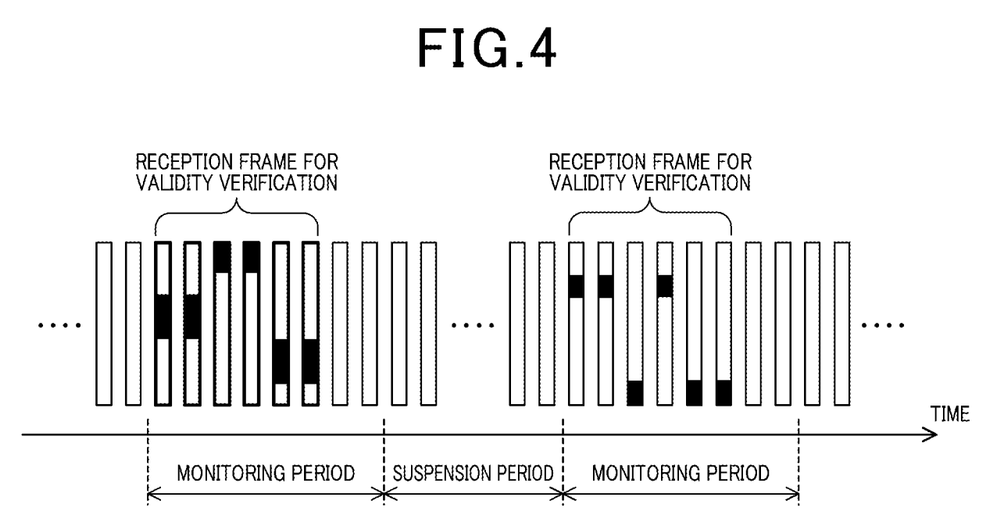
FIG. 4 is diagram for explaining verification of frame validity in a second modification.

The object determination unit 46 may determine a different field or a set of fields as the object section for each of a plurality of sets of the reception frames for each monitoring period. Also in this case, the object section may be determined from the above-described field groups for which the frame is divided according to a predetermined division rule.

According to the configuration, since the arbitrariness of the object section used for the verification for each monitoring period is improved, the detection probability of the improper frame can be increased.

FIG. 4 is a diagram for explaining the verification of the frame validity in the second modification. Similarly to FIG. 3, in FIG. 4, the horizontal axis is time, and each vertically long rectangle is the frame transmitted through the communication line 4a at each time.

In FIG. 4, the black-painted part in the thick-line rectangle illustrating the reception frame used for the validity verification is the attention section extracted corresponding to the object section. In the example in FIG. 4, a different object section is determined for each of three reception frame sets respectively configured by two reception frames in the monitoring period on the left side in the figure. In addition, in the monitoring period on the right side in the figure, a different object section is determined for each of two reception frame sets respectively configured by three reception frames.

Note that each set of the reception frames in each monitoring period may not be always configured by continuous frames as illustrated in the monitoring period on the right side in FIG. 4.

Third Modification

When the verification unit 48 determines that at least one of attention sections extracted by the extraction unit 47 from each of the reception frames is not proper, the object determination unit 46 may increase the number of the field groups to be determined as the object section from the plurality of divided field groups.

According to the configuration, the detection probability of the improper frame can be adjusted by changing the number of the field groups used for the verification corresponding to a situation of impropriety detection.

Fourth Modification

When the verification unit 48 determines that at least one of the attention sections extracted by the extraction unit 47 from each of the reception frames is not proper, the object determination unit 46 may determine all of the plurality of divided field groups as the object section.

According to the configuration, since the validity of the reception frame is verified using all the field groups corresponding to the situation of the impropriety detection, the detection probability of the improper frame can be adjusted to be higher.

Fifth Modification

The verification unit 48 may increase or extend the time length of the monitoring period when one of the reception frames is determined as not being proper.

According to the configuration, the detection probability of the improper frame can be adjusted by extending the monitoring period (that is, a reception period of the frames used for the validity verification) corresponding to the situation of the impropriety detection.

Sixth Modification

The verification unit 48 may increase the predetermined number of the reception frames to be extracted for each monitoring period when one of the extracted reception frames is determined as not being proper.

According to the configuration, the detection probability of the improper frame can be adjusted by increasing the number of the reception frames for each monitoring period used for the verification corresponding to the situation of the impropriety detection.

Seventh Modification

The verification unit 48 may repeatedly set the monitoring periods with a suspension period in-between, and irregularly change the time length of the suspension period within a predetermined range on a regular basis or randomly for example.

According to the configuration, since the monitoring period is set so as to start from an irregular time along a flow of time, it is made difficult for a malicious person to specify the monitoring period and an attack via the in-vehicle network can be effectively detected.

Operation of Communication Monitoring Device 40

Figure 5:
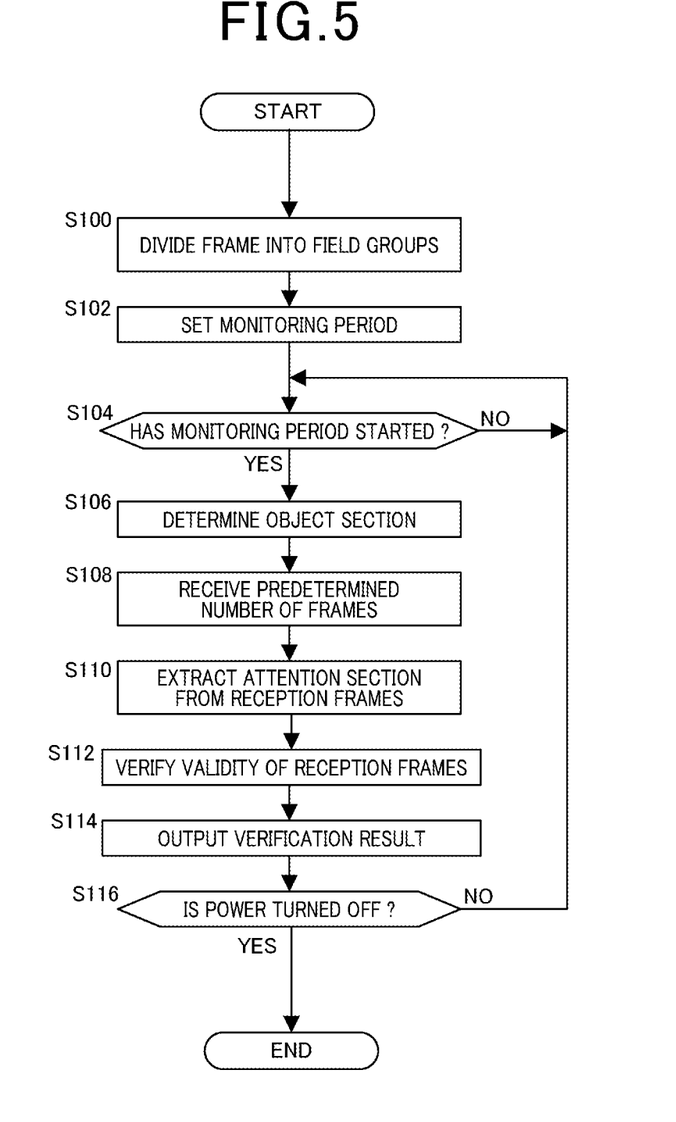
FIG. 5 is a flowchart illustrating a procedure of an operation of the communication monitoring device.

Next, a procedure of the operation of the communication monitoring device 40 will be described. FIG. 5 is a flowchart illustrating an example of the procedure of the operation of the communication monitoring device 40. Processing in FIG. 5 is repeatedly executed at a predetermined time interval for example.

When the processing is started, first, the object determination unit 46 divides the frame used for the communication into a plurality of field groups according to one division rule (S100). Then, the verification unit 48 sets the monitoring period of the predetermined time length (S102). Subsequently, the object determination unit 46 determines whether or not the monitoring period has started (S104). Then, when the monitoring period has not started (S104, NO), the object determination unit 46 returns to step S104 to repeat the processing and waits for the monitoring period to start.

On the other hand, when the monitoring period starts (S104, YES), the object determination unit 46 determines at least one of the divided field groups as the object section (S106). In addition, the reception unit 45 receives the predetermined number of the frames from the communication lines 4 in the monitoring period (S108), and the extraction unit 47 extracts the determined object section from each of the predetermined number of the received frames as the attention section (S110).

Next, the verification unit 48 verifies, based on the extracted attention sections, the validity of the reception frames including the attention sections (S112), and transmits and outputs a result of the verification to the central ECU 2 for example (S114).

Subsequently, the processor 41 determines whether or not a power source of the communication monitoring device 40 is turned off (S116), and ends the present processing when the power source is turned off (S116, YES). On the other hand, when the power source of the communication monitoring device 40 is not turned off (S116, NO), the processor 41 returns to step S104 to repeat the processing.

Other Embodiments

Note that the present invention is not limited to the configuration of the embodiment described above, and can be implemented in various modes without deviating from the gist.

For example, the communication monitoring device 40 monitors the communication in the three communication lines 4 in the embodiment described above, but may similarly monitor the communication in more than three communication lines.

In addition, the communication monitoring device 40 is described as a single device in the embodiment described above, but may be realized as a part of another in-vehicle ECU. For example, by integrating the processor 41 and the memory 42 with a processor and a memory (both not illustrated) provided in the central ECU 2, the communication monitoring device 40 may be realized as a part of the central ECU 2.

Further, the control system 1 includes one communication monitoring device 40 in the embodiment described above, but may include an arbitrary number, which is two or larger, of the communication monitoring devices 40. For example, the control system 1 may include two communication monitoring devices 40, one may monitor the communication of a part of the communication lines 4 and the other one may monitor the communication of the other part of the communication lines 4.

In addition, the communication monitoring device 40 monitors the validity for the frames based on the CAN communication standard in the embodiment described above. However, the communication monitoring device 40 is similarly applicable regarding the other kinds of communication that perform the communication using frames, without being limited to the CAN.

Configurations Supported By Embodiments Described Above

The embodiments and modifications described above support the configurations below.

(Configuration 1) A communication monitoring device which monitors communication via an in-vehicle network performed among a plurality of electronic controllers, the communication being configured by a column of one or more frames, the communication monitoring device including: an object determination unit configured to determine some or all of fields configuring the frame as an object section; a reception unit configured to receive the frame propagated through the in-vehicle network; an extraction unit configured to extract the object section as an attention section from a reception frame which is the frame received by the reception unit; and a verification unit configured to verify validity of the reception frame based on the extracted attention section.

According to the communication monitoring device of configuration 1, the validity of the reception frame is verified based on the attention section which is a part of the reception frame so that processing loads for the validity verification are reduced compared to a conventional technology of examining control information and state information of the frames communicated for a specific controlled object. In addition, in the communication monitoring device of configuration 1, the object section which stipulates the attention section can be arbitrarily selected from the frame so that all the frames are finally verified by repetition of verification processing, and the high detection probability of the improper frame can be maintained.

(Configuration 2) The communication monitoring device according to configuration 1, wherein the object determination unit divides the frame used for the communication into a plurality of field groups according to one division rule, and determines at least one of the field groups as the object section.

According to the communication monitoring device of configuration 2, since the object section is selected from the field groups, a reference for the validity verification in the object section can be easily determined according to the content definition of the fields included in the field group for example.

(Configuration 3) The communication monitoring device according to configuration 2, wherein the extraction unit counts a usage count for which each of the field groups is used for extraction of the attention section, and the object determination unit determines, when a difference between a maximum value and a minimum value of the usage counts among the field groups is a first predetermined value or larger, at least one new object section from the plurality of divided field groups excluding the field group the usage count of which is the maximum value.

According to the communication monitoring device of configuration 3, since the object section is selected from the field groups other than the field group which is used many times, the high detection probability of the improper frame can be further accurately maintained.

(Configuration 4) The communication monitoring device according to configuration 3, wherein the object determination unit determines a new object section from all the divided field groups, when the difference between the maximum value and the minimum value of the usage counts among the field groups is smaller than a second predetermined value.

According to the communication monitoring device of configuration 4, since a new object section is selected from all the field groups when the difference of the usage counts among the field groups becomes small, the high detection probability of the improper frame can be further accurately maintained.

(Configuration 5) The communication monitoring device according to any one of configurations 2-4, wherein the extraction unit counts a usage count for which each of the field groups is used for extraction of the attention section, and the object determination unit changes the division rule, newly divides the frame into a plurality of field groups according to the changed division rule, and determines at least one of the plurality of newly divided field groups as the object section, when the difference between the maximum value and the minimum value of the usage counts among the field groups is smaller than a third predetermined value.

According to the communication monitoring device of configuration 5, since the division rule of the field groups is changed, the arbitrariness of the object section used for the verification is improved. In addition, since the division rule of the field groups is changed when the difference of the usage counts among the field groups becomes small, the decline of the detection probability of the improper frame due to the change of the division rule in the state where the individual parts of the frame are not equally verified is prevented.

(Configuration 6) The communication monitoring device according to configuration 5, wherein the extraction unit initializes, when the object determination unit newly divides the frame into a plurality of field groups according to the changed division rule, the usage counts of all the newly divided field groups to 0.

According to the communication monitoring device of configuration 6, since the count values of the usage counts are reset accompanying the change of the division rule, the usage counts for the sections divided according to the new division rule can be appropriately counted.

(Configuration 7) The communication monitoring device according to any one of configurations 2-6, wherein the object determination unit increases the number of the field groups to be determined as the object section from the plurality of divided field groups, when the verification unit determines that at least one of the attention sections extracted by the extraction unit from each of the reception frames is not proper.

According to the communication monitoring device of configuration 7, the detection probability of the improper frame can be adjusted by changing the number of the field groups used for the verification corresponding to the situation of the impropriety detection.

(Configuration 8) The communication monitoring device according to any one of configurations 2-6, wherein the object determination unit determines all of the plurality of divided field groups as the object section, when the verification unit determines that at least one of the attention sections extracted by the extraction unit from each of the reception frames is not proper.

According to the communication monitoring device of configuration 8, since the validity of the reception frame is verified using all the field groups corresponding to the situation of the impropriety detection, the detection probability of the improper frame can be adjusted to be higher.

(Configuration 9) The communication monitoring device according to any one of configurations 2-8, wherein the verification unit sets a monitoring period of a predetermined time length, and the reception unit receives the frame propagated through the in-vehicle network in the monitoring period.

According to the communication monitoring device of configuration 9, since the communicated frame is monitored only in the monitoring period of the predetermined time length, the processing loads for the validity verification of the frame are reduced.

(Configuration 10) The communication monitoring device according to configuration 9, wherein the object determination unit randomly determines at least one of the field groups as the object section every time the monitoring period starts.

According to the communication monitoring device of configuration 10, since the object section is randomly determined for each monitoring period, the high detection probability of the improper frame can be more accurately maintained.

(Configuration 11) The communication monitoring device according to configuration 9 or 10, wherein the verification unit verifies the validity for a predetermined number of the reception frames in each monitoring period, and increases the time length of the monitoring period when one of the reception frames is determined as not being proper.

According to the communication monitoring device of configuration 11, the detection probability of the improper frame can be adjusted by extending the monitoring period which is a reception period of the frames used for the validity verification corresponding to the situation of the impropriety detection.

(Configuration 12) The communication monitoring device according to configuration 11, wherein the verification unit increases the predetermined number when one of the extracted reception frames is determined as not being proper.

According to the communication monitoring device of configuration 12, the detection probability of the improper frame can be adjusted by increasing the number of the reception frames for each monitoring period used for the verification corresponding to the situation of the impropriety detection.

(Configuration 13) The communication monitoring device according to any one of configurations 9-12, wherein the verification unit repeatedly sets the monitoring periods with a suspension period in-between, and irregularly changes the time length of the suspension period within a predetermined range.

According to the communication monitoring device of configuration 13, since the monitoring period is set so as to start from an irregular time along the flow of time, it is made difficult for a malicious person to specify the monitoring period and an attack via the in-vehicle network can be effectively detected.

(Configuration 14) The communication monitoring device according to any one of configurations 9-13, wherein the object determination unit determines a different field or a set of fields as the object section for each of a plurality of sets of the reception frames for each monitoring period.

According to the communication monitoring device of configuration 14, the arbitrariness of the object section used for the verification for each monitoring period is improved, and the detection probability of the improper frame can be increased.

(Configuration 15) A communication monitoring method conducted by a computer of a communication monitoring device which monitors communication via an in-vehicle network performed among a plurality of electronic controllers, the communication being configured by a column of one or more frames, the communication monitoring method comprising: a step of determining some or all of fields configuring the frame as an object section; a step of repeatedly receiving the frame propagated through the in-vehicle network; a step of extracting the object section as an attention section from a reception frame which is the frame received in the receiving step; and a step of verifying validity of the reception frame based on the extracted attention section.

According to the communication monitoring method of configuration 15, the validity of the reception frame is verified based on the attention section which is a part of the reception frame so that processing loads for the validity verification are reduced compared to a conventional technology of examining control information and state information of the frames communicated for a specific controlled object. In addition, in the communication monitoring method of configuration 15, the object section which stipulates the attention section can be arbitrarily selected from the frame so that all the frames are finally verified by repetition of verification processing, and the detection probability of the improper frame can be maintained high.

REFERENCE SIGNS LIST

1 . . . control system, 2 . . . central ECU, 4a, 4b, 4c . . . communication line, 20 . . . zone ECU, 20a . . . first zone ECU, 20b . . . second zone ECU, 20c . . . third zone ECU, 30, 30a, 30b, 30c, 30d, 30e, 30f, 30g, 30h, 30i . . . ECU, 40 . . . communication monitoring device, 41 . . . processor, 42 . . . memory, 43 . . . communication device, 44 . . . communication monitoring program, 45 . . . reception unit, 46 . . . object determination unit, 47 . . . extraction unit, 48 . . . verification unit.

What is claimed is:

1. A communication monitoring device which monitors communication via an in-vehicle network performed among a plurality of electronic controllers,
the communication being configured by a column of one or more frames,
the communication monitoring device comprising a processor that is configured to:
determine some or all of fields configuring the frame as an object section;
receive the frame propagated through the in-vehicle network;
extract the object section as an attention section from a reception frame which is the frame received; and
verify validity of the reception frame based on the extracted attention section,
wherein the processor divides the frame used for the communication into a plurality of field groups according to one division rule, and determines at least one of the field groups as the object section.

2. The communication monitoring device according to claim 1,
wherein the processor is configured to count a usage count for which each of the field groups is used for extraction of the attention section, and
the processor is configured to determine, when a difference between a maximum value and a minimum value of the usage counts among the field groups is a first predetermined value or larger, at least one new object section from the plurality of divided field groups excluding the field group the usage count of which is the maximum value.

3. The communication monitoring device according to claim 2,
wherein the processor is configured to determine a new object section from all the divided field groups, when the difference between the maximum value and the minimum value of the usage counts among the field groups is smaller than a second predetermined value.

4. The communication monitoring device according to claim 1,
wherein the processor is configured to count a usage count for which each of the field groups is used for extraction of the attention section, and
the processor is configured to change the division rule, newly divide the frame into a plurality of field groups according to the changed division rule, and determine at least one of the plurality of newly divided field groups as the object section, when a difference between a maximum value and a minimum value of the usage counts among the field groups is smaller than a third predetermined value.

5. The communication monitoring device according to claim 4,
wherein the processor is configured to initialize, when the processor newly divides the frame into a plurality of field groups according to the changed division rule, the usage counts of all the newly divided field groups to 0.

6. The communication monitoring device according to claim 1,
wherein the processor is configured to increase the number of the field groups to be determined as the object section from the plurality of divided field groups, when the processor determines that at least one of the attention sections extracted from each of the reception frames is not proper.

7. The communication monitoring device according to claim 1,
wherein the processor is configured to determine all of the plurality of divided field groups as the object section, when the processor determines that at least one of the attention sections extracted from each of the reception frames is not proper.

8. The communication monitoring device according to claim 1,
wherein the processor is configured to set a monitoring period of a predetermined time length, and
the processor is configured to receive the frame propagated through the in-vehicle network in the monitoring period.

9. The communication monitoring device according to claim 8,
wherein the processor is configured to randomly determine at least one of the field groups as the object section every time the monitoring period starts.

10. The communication monitoring device according to claim 8,
wherein the processor is configured to:
verify the validity for a predetermined number of the reception frames in each monitoring period, and
increase the time length of the monitoring period when one of the reception frames is determined as not being proper.

11. The communication monitoring device according to claim 10,
wherein the processor is configured to increase the predetermined number when one of the extracted reception frames is determined as not being proper.

12. The communication monitoring device according to claim 8,
wherein the processor is configured to:
repeatedly set the monitoring periods with a suspension period in-between, and
irregularly change the time length of the suspension period within a predetermined range.

13. The communication monitoring device according to claim 8,
wherein the processor is configured to determine a different field or a set of fields as the object section for each of a plurality of sets of the reception frames for each monitoring period.

14. A communication monitoring method conducted by a computer of a communication monitoring device which monitors communication via an in-vehicle network performed among a plurality of electronic controllers,
the communication being configured by a column of one or more frames,
the communication monitoring method comprising:
a step of determining some or all of fields configuring the frame as an object section;
a step of repeatedly receiving the frame propagated through the in-vehicle network;
a step of extracting the object section as an attention section from a reception frame which is the frame received in the receiving step; and
a step of verifying validity of the reception frame based on the extracted attention section,
wherein in the step of determining, the frame used for the communication is divided into a plurality of field groups according to a division rule, and at least one of the field groups is determined as the object section.

* * * * *